(12) United States Patent
Silberberg

(10) Patent No.: US 8,075,016 B2
(45) Date of Patent: Dec. 13, 2011

(54) SHOPPING CART

(76) Inventor: Brian Silberberg, North Miami Beach, FL (US)

(*) Notice: Subject to any disclaimer, the term of this patent is extended or adjusted under 35 U.S.C. 154(b) by 914 days.

(21) Appl. No.: 11/876,040

(22) Filed: Oct. 22, 2007

(65) Prior Publication Data
US 2008/0093827 A1    Apr. 24, 2008

Related U.S. Application Data

(60) Provisional application No. 60/853,356, filed on Oct. 20, 2006.

(51) Int. Cl.
*B62B 3/02* (2006.01)

(52) U.S. Cl. .......................................... 280/641; 280/43

(58) Field of Classification Search ................ 280/638, 280/639, 641, 651, 33.991, 33.995, 43, 43.13, 280/43.17
See application file for complete search history.

(56) References Cited

U.S. PATENT DOCUMENTS

| | | | | |
|---|---|---|---|---|
| 3,669,031 A | * | 6/1972 | Cole | 108/102 |
| 5,649,718 A | * | 7/1997 | Groglio | 280/641 |
| 6,045,150 A | * | 4/2000 | Al-Toukhi | 280/641 |
| 6,070,899 A | * | 6/2000 | Gines | 280/651 |
| 6,152,462 A | * | 11/2000 | Barrett | 280/30 |
| 6,575,491 B2 | * | 6/2003 | Miller | 280/638 |

* cited by examiner

*Primary Examiner* — Frank Vanaman

(57) ABSTRACT

An improved shopping cart having retractable legs is provided that allows the cart to be loaded into a vehicle while contents remain in the shopping cart basket.

1 Claim, 15 Drawing Sheets

SHOPPING CART

INDEX TO RELATED APPLICATIONS

This application claims the benefit of U.S. Provisional Patent Application Ser. No. 60/853,356,filed Oct. 20, 2006, the disclosure of which is incorporated herein by reference in its entirety.

BACKGROUND OF THE INVENTION

Conventional shopping carts are limited for use within the compounds of a shopping establishment. Shoppers have to manually transfer their goods from the cart into their vehicles. Then they have to manually carry the goods, usually in several trips, from the vehicle to their homes. This is difficult for people with infants or small children, especially for those who dwell in tall buildings. These people at times have to park their vehicles from a distance to their building entrances. They have to carry their goods into the building, into the elevator, through the hallways, then finally into their dwelling units. These difficulties are further enhanced in inclement weather conditions.

There are inventions of folding or collapsing carts, such as U.S. Pat. No. 4,765,644 , issued Aug. 23, 1988 ,and U.S. Pat. No. 5,700,021 , issued Dec. 23, 1997 , where the user has to empty and transfer the cart's contents into the vehicle, then it is folded, picked up and loaded into the vehicle. These current inventions do not allow the users to effortlessly load the cart without taking out its contents directly into the vehicle.

An invention by Cortes U.S. Pat. No. 5,906,383 , issued May 25, 1999 , for a "Home Shopping Cart" consists of a low profile cart with handles attached to the top edge of the basket. The user has to manually lift the entire cart from the ground and load it into a vehicle's trunk.

U.S. Pat. No. 7,080,844 some of the problems unsolved by the above-mentioned patents allow the user to conveniently load and unload the transportable shopping cart with its contents in and out of their vehicles without manually transferring their goods nor lifting the entire cart. The invention in the '844 patent is complex and requires shocks, and other complicated mechanics, that make operation impractical.

BRIEF SUMMARY OF THE INVENTION

In one embodiment, the shopping cart of the present invention may eliminate the amount of work needed to transfer the shopping bags from the shopping center into the home. The present invention gives a user the ability to make only one trip from the trunk of a car to the inside of their home with all of user purchases. It allows transport in one trip without physical exertion on the part of the consumer. This shopping cart can remain fully loaded from the time the bagger puts the shopping bags full of merchandise into the cart, until it arrives home. Upon arriving at a destination the shopping cart full of bags will be taken right out of the trunk and wheeled to its destination without having to lift and carry the bags or basket. At the present time, a consumer who has a trunk full of shopping bags must make several trips from their car, into their home to bring in all their purchases. Some of these bags may be very heavy and be difficult for the consumer to manage.

People living in apartment buildings or the elderly have an even more difficult time getting their shopping bags from their trunk into their homes.

This shopping cart will eliminate the need for numerous trips in order to empty a trunk full of shopping bags.

In one preferred use, the invention comprises a system and method whereby a person before they go shopping takes their own basket from their trunk and goes shopping. The person opens the trunk of their car, and lifts the empty basket about 3-4 inches in the back enough to clear the bumper and remove, angling it at about 45 degrees, shifting the weight to the front of the cart. Then the person pulls it away from the car, the wheel in front allows for it to easily slide forward. It will slide over the bumper until it is resting on the bumper, and parallel to ground. Then the user slides the tracks out standing on either side of the basket, the legs will slide out, and open as it slides out. Then the user will lock the F looking brackets. Once the wheels and base are parallel to the ground, the user will know when to stop pushing the tracks back in because it wont be able to go on anymore and the F brackets will be able to fit into place. Then the user pulls the basket out of the trunk and goes shopping.

Once done, the user will open the trunk and push the basket into the trunk. The height of the legs are measured so that the basket can slide right into the trunk with out having to lift the basket. In one embodiment, depending on the model of the car, an optional snap on cargo net might be needed to keep the groceries in the basket when putting in the trunk. When the basket is sliding in the trunk, it can be raised to about a 45 degree angle, which might cause some of the items to fall out of the basket, if a net was not on it to stop it. Once the front half of the basket is inside the trunk, the user will pull each of the F brackets simultaneously towards the middle of the basket, allowing them to unlock and allowing the tracks to slide. The user then slides the tracks out as needed, until there is enough room for the base to clear the bumper or undercarriage. Once the base is cleared, the user lifts the base. This causes the legs to rotate away from the car until the base is substantially parallel to the tracks. Once it is all the way up, the user will then proceed to slide the tracks and base into the vehicle. Once the tracks are all the way in, the user will push the basket further into the vehicle. Depending on the size of the trunk, a user may have to lift the back an inch or two while pushing in, to allow the cart to slide in. Once fully in, the user closes the trunk and drives home. The use then repeats first section on taking it out of the trunk.

Later designs might include folding walls, with 90-degree angular brackets with locking mechanisms at the top corner of each wall to lock the basket open.

Basket

In one embodiment the basket may have 4 metal mesh walls making it see through.

Also the walls may have pins at the bottom allowing them to pivot inwards, and allowing it to fold.

If the cart uses the pins, there will be a locking mechanism at the top of each corner to latch onto the adjacent wall.

The inside of the basket has different levels. The outside levels are higher to allow for the tracks to slide in underneath the basket.

The back of the bottom of the basket is also raised to allow for the legs to be placed underneath the basket, and to minimize on space.

The back wall may have a standard child seat in it.

The front bottom of the basket may have two wheels on the sides to allow for the basket to slide in easily to the trunk.

Legs

In a preferred embodiment, there may be two sets of parallel legs connected in the back of the cart with two perpendicular bars.

Each Leg will have two sets of bars, each on pivots at the top and bottom, connecting the legs to the tracks.

Each set of bars will have a support bar attached to the other.

Locking

In a preferred embodiment, the legs may be locked by two sliding F shaped locks. When extended fully they will lock to prevent the legs from sliding and pivoting at undesired times.

Disengaging the locks allows for the tracks to move and the legs to pivot.

Another locking design might lock both legs on each side rather then one. Depending on how much weight the basket is intended to hold.

Also a lock that is shaped with a tight fit when the lock is out, but as it goes inwards it opens up allowing it to easily find the legs and get set into position.

Tracks

In a preferred embodiment, there will be two sets of tracks underneath the basket. The outer track will have bearings on top and bottom to allow the track to slide smoothly. On the inner side of the track will be another inner track to allow the bar, which connects to the legs, to slide on. The inner track will be able to slide to the front end of the basket, and exit half way out of the back of basket. The outer track allows inner track to slide the legs to from the back of the basket to the front of the basket, enough to allow the legs to fold up substantially parallel to the tracks. While it is resting on the bumper or half inside the trunk, with the basket half inside the trunk the locks are disengaged and the legs can be pulled away from the trunk if the legs need extra room to clear the trunk once the legs are clear, the legs are pulled up and slide inwards. This can be done in three different ways. First manually, second with springs to assist, thirdly motorized.

The Inner track will allow the legs to slide from the back of the cart to the front of the cart once the legs are folded up. Then it will slide in stopping when it hits the front of the basket, and can't slide anymore, or when the operator wants to start angling it.

Another design for a track allows the track to slide in automatically. This will be an optional addition that can be added to the car, which will help the car cart slide in. It will pull the basket into the trunk, and also rotate the basket so that it will angle and be able to fit in. This device will use the power from the car. It will also help with lifting the basket out of the trunk, and slide it out. So it will help it go in the trunk, and out of the trunk. The basket will have a track for this optional device to work with. It will have teeth molded into the track so a gear attached to the motor will fit into. When the gear rotates it will fit in the teeth causing it to push or pull the cart. There will be a lever arm attached to another motor, to rotate the basket up or down to help with the angling of the basket needed to put the cart in or take it out.

Wheels

In a preferred embodiment there may be two locked wheels in the back, with a set of casters in the front.

The front casters will be connected to the two parallel bars that are perpendicular to the legs as shown in W.1

Another design might have all four wheels as casters, to allow for maximum movement.

The examples described in the accompanying figures are for illustrative purposes only and are not intended to limit the inventive aspects of the invention.

The present invention encompasses the need to account for a vehicle bumper in configuration. The present invention improves upon previous attempts in that there is no need for shock absorbing mechanisms and other complicated mechanics. Thus, the present invention does not require a user to exert a great deal of strength and effort when loading and unloading.

The present invention further has a tack system underneath the basket allowing it to be wider and taller then the current design.

Optionally, the present invention may comprise a safety feature of having a receiving rail mounted to the car that has a hinge that can fold open when the truck is open. The hinge will engage the cart so that the cart will not fall back towards the user when it is sliding into the trunk. Also the bracket can rotate into the trunk, but not out of the trunk, so that as the basket is going into the trunk it will rotate to allow it to slide in smoothly, and controllably.

Optionally, a standard child seat can be included in the design but since the inventor did not make any new child seat it is not included in these drawings but it is understood that a standard child seat might be included in the end design.

BRIEF DESCRIPTION OF THE DRAWINGS

FIGS. 8-20 demonstrates progressive sequential views of the shopping cart frame being retracted with the locks unlocked.

FIG. 8 is a side perspective view of the cart with the frame in an extended position.

FIG. 9 is a side perspective view of the cart with the beginning of retraction of the frame.

FIG. 10 is a side perspective view of the cart with the beginning of retraction of the frame.

FIG. 11 is a side perspective view from underneath the cart demonstrating the frame placed in a horizontal orientation relative to the shopping cart basket.

FIG. 12 is a partial side perspective view from above demonstrating the frame placed in a horizontal orientation relative to the shopping cart basket.

FIG. 13 is a partial side perspective view from above demonstrating the frame placed in a horizontal orientation relative to the shopping cart basket with legs sliding into the basket.

FIG. 14 is a partial side perspective view demonstrating the frame being moved into position underneath the basket of the shopping cart.

FIG. 15 is a partial spot side perspective view demonstrating the frame in retracted position underneath the basket of the shopping cart.

DETAILED DESCRIPTION OF THE PREFERRED EMBODIMENTS

Figure 1:
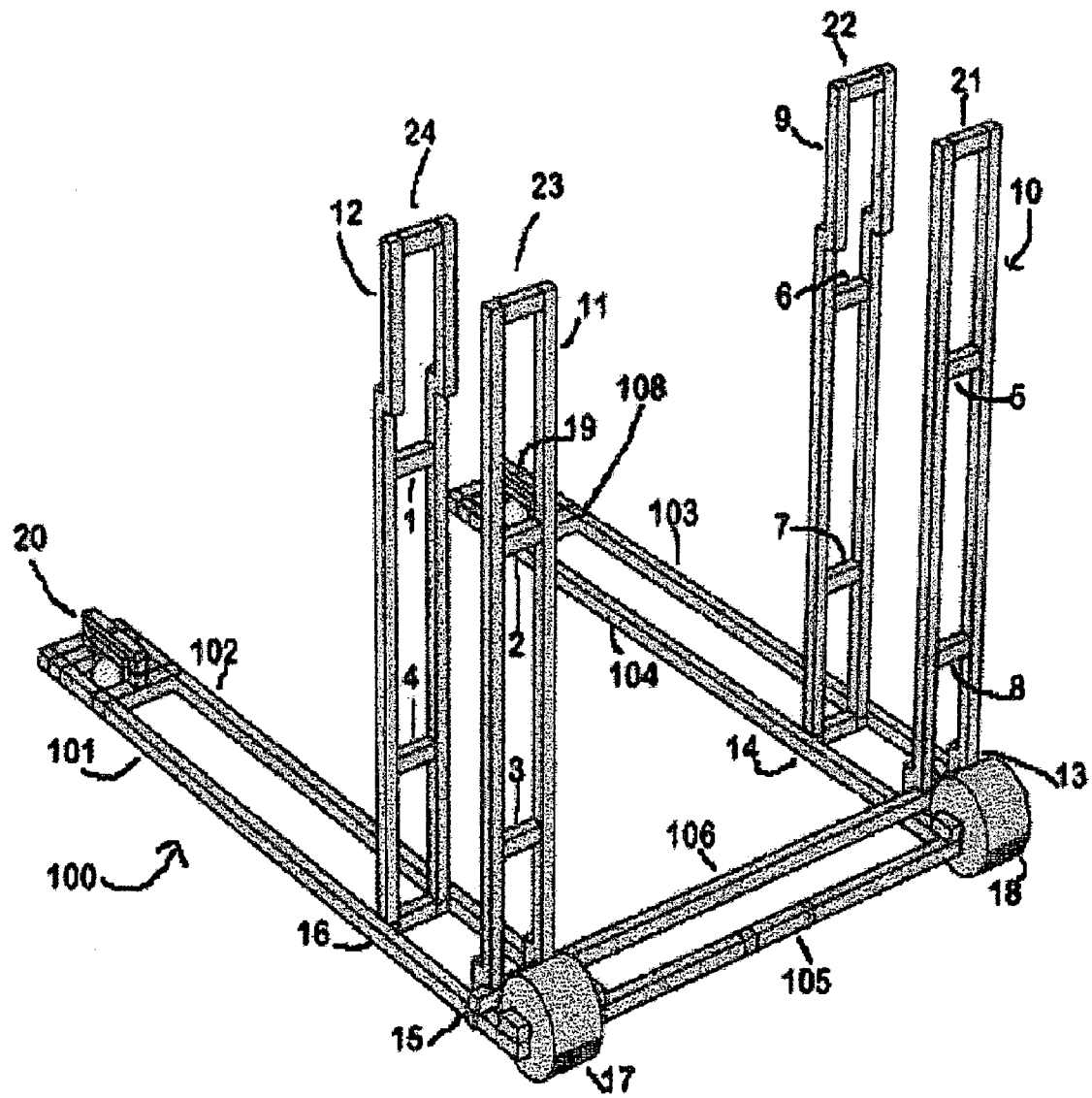
FIG. 1 is a side perspective view of the shopping cart frame.
Figure 2:
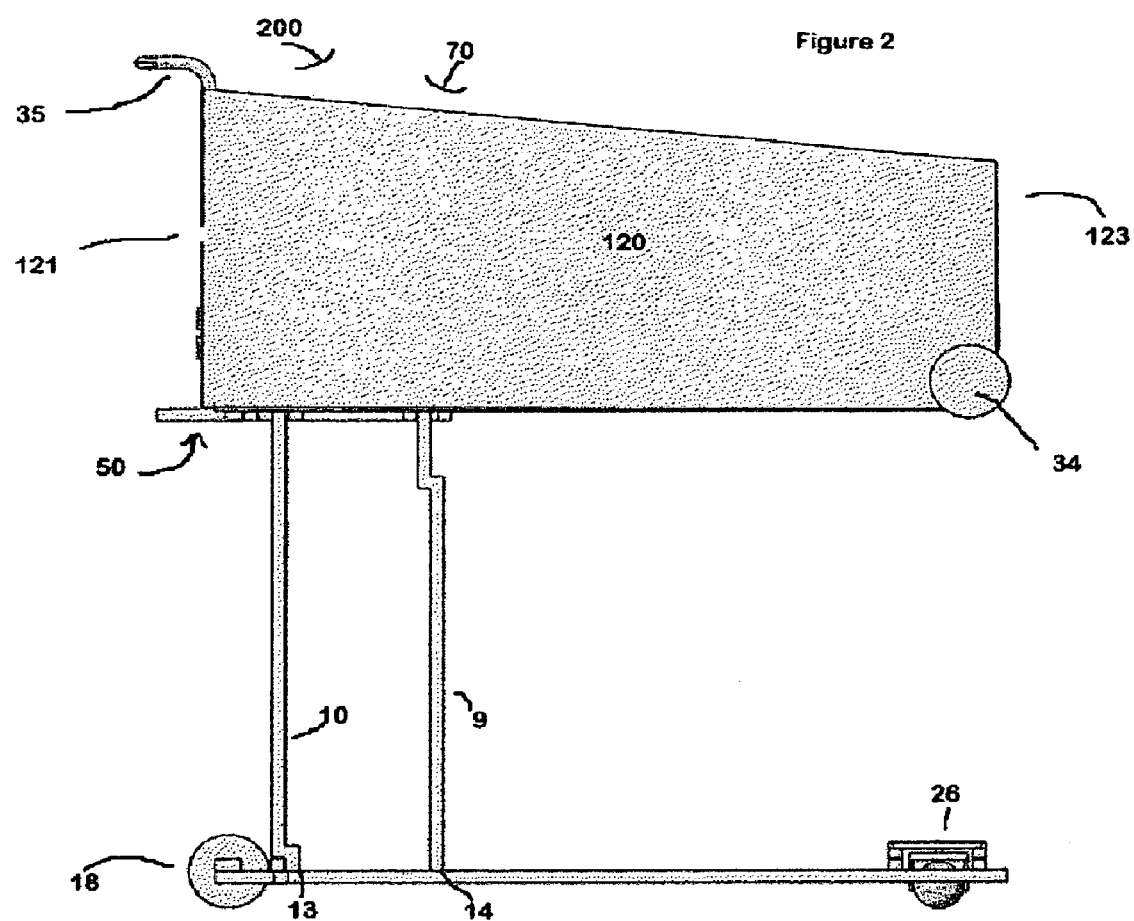
FIG. 2 is a side view of the shopping cart.

The shopping cart 200 of the present invention includes collapsible frame 100. Frame includes a base portion configured rectangularly with three portions of a rectangular configuration having left frame portion formed by left frame base members 101 and 102 a right frame portion formed by a right based members 103 and 104 that are secured into the desired configuration through traverse the base members 105 and 106. Left frame base members 101 and 102 have an attached back left fixed wheel 17 and front left caster 20. Right based members 103 and 104 have an attached back right fixed wheel 18 and front left caster 19. Frame 100 also includes front left leg 12, back left leg 11, front right leg 9, and back right leg 10. Each leg 9, 10, 11, 12, include incorporated pivots mechanisms for extension and retraction of legs as desired.

Front left leg 12 has and front bottom pivot 16, and front top pivot 24. Leg 12 also has top leg brace 1, and bottom leg brace 4. Front left leg 12 attaches to frame 100 in between left frame base members 101 and 102. Back left leg 11 has bottom pivot 15, top pivot 23, top leg brace 2, and lower leg brace 3. Back left leg 11 attaches to frame 100 in between left frame base members 101 and 102.

Front right leg 9 has bottom pivot 14, top pivot 22, bottom brace 7, and top brace 6. Back right leg 10 has bottom pivot 13, top pivot 12, bottom brace 8, and top brace 5.

Shopping cart 200 has basket 70 that is attached to frame 100 at each of the pivots 21, 22, 23, and 24. Basket 70 has a front wall 123, a right side wall 120, back wall 121, a left side wall 122 and a bottom 124 that collectively form a basket cavity 125.

Basket 70 additionally has hinges 36, 37, 38, and 39 along back wall 121 for hingedly opening back wall 121 to load and unload articles from basket cavity 125.

Basket 70 has a female configured left outer track 47 and a corresponding right female inner track 48, a female configured right outer track 43 and a corresponding female configured right inner track 41 that are each connected to and positioned along the underside length of basket 70. Front left leg 12 and back left leg 11 each attach to male inner track 45 and left our track 46 at pivots 23 and 24. Front right leg 9 and back right leg 10 each attach to male inner track 40 and male outer track 42 at pivots 22 and 21 respectively.

Shopping cart 200 incorporates a locking mechanism to prevent unwanted retraction of legs 9, 10, 11, and 12.

Left locking bar 49 includes first front left locking bar 73 and second front left locking bar 74 and first back left locking bar 72 and second back left locking bar 71. The locking mechanism is actuated by spring 62 connected to a left inner spring support 60 and left outer spring support 61, whereby spring 62 urges bar 49 outward from a center plane A-A. When in a locked position, locking bars 73 and 74 are moved into position in front of and behind leg 12. When in a locked position, locking bars 71 and 72 are moved into position in front of and behind leg 11.

Right locking bar 50 includes first front right locking bar 75 and second front right locking bar 76 and first back right locking bar 77 and second back right locking bar 78. The locking mechanism is actuated by spring 66 connected to a right inner spring support 63 and right outer spring support 64, whereby spring 65 urges bar 50 outward from a center plane A-A. When in a locked position, locking bars 75 and 76 are moved into position in front of and behind leg 9. When in a locked position, locking bars 77 and 78 are moved into position in front of and behind leg 10.

Figure 3:
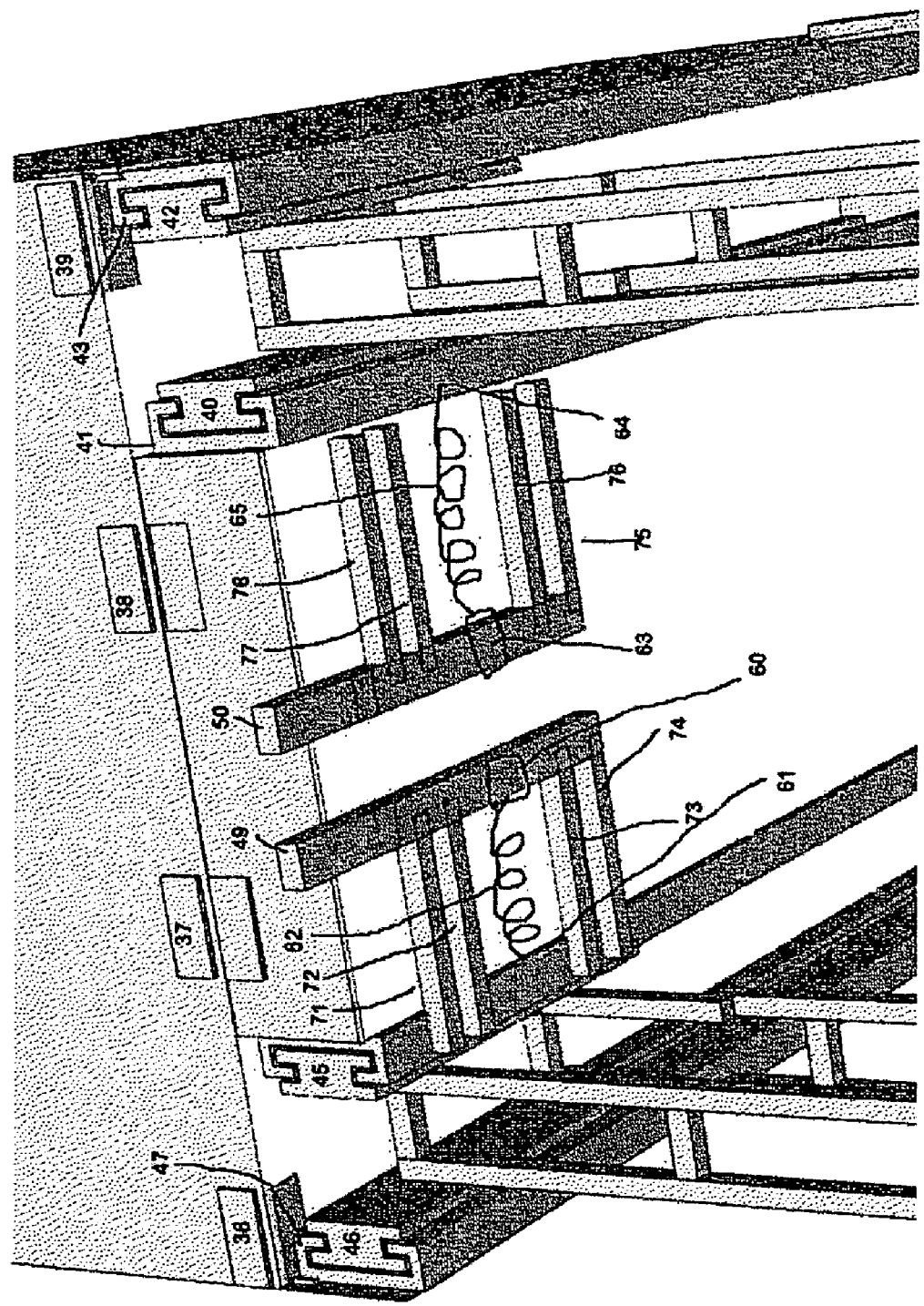
FIG. 3 is a detailed view showing the underside of the shopping carts basket.
Figure 4:
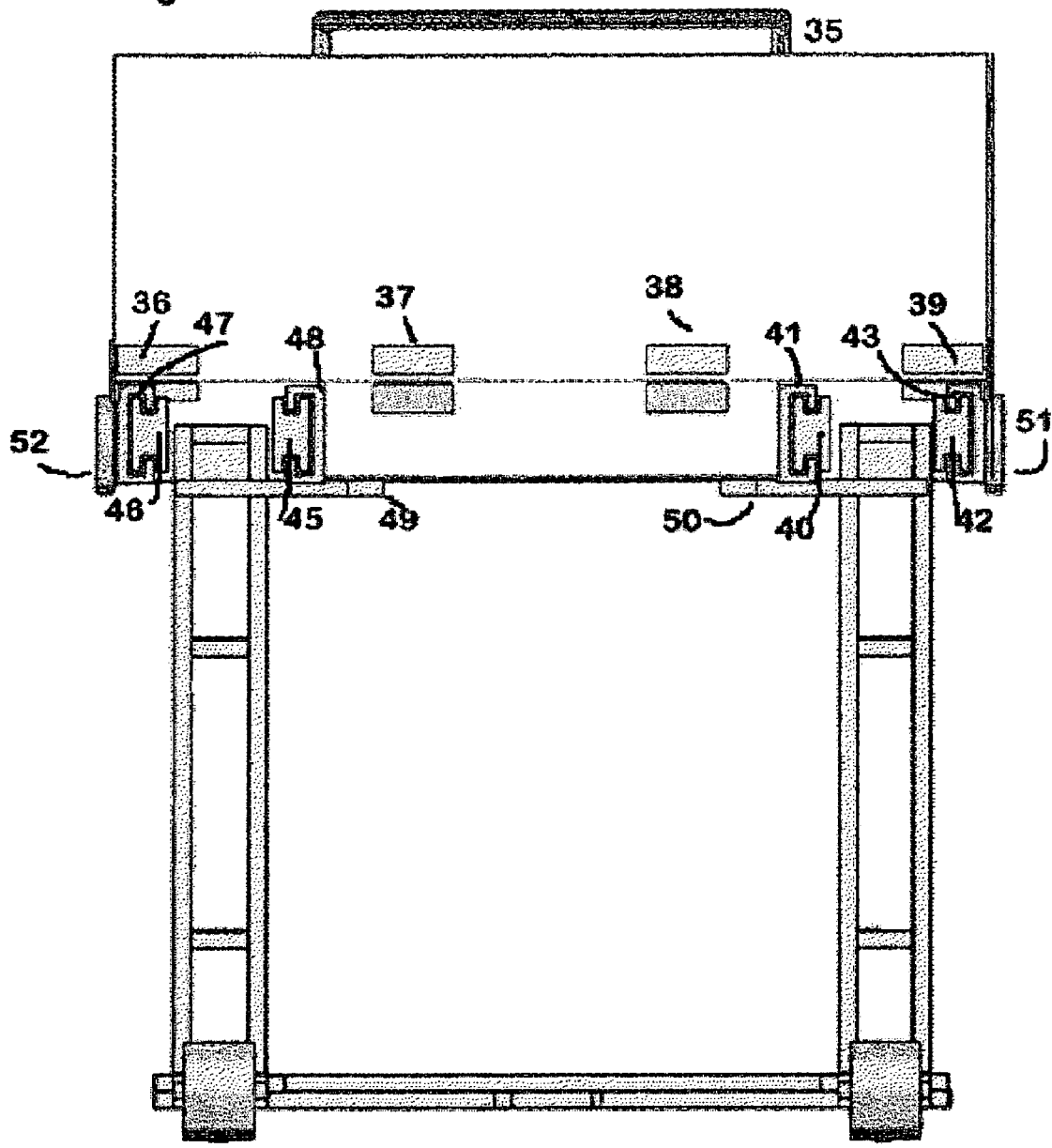
FIG. 4 is a rearview of the shopping cart.

Frame 100 retracts went each of the left locking bar 49 and write locking bar 50 are moved toward one another inward along plane A-A. FIGS. 8 through 15 sequentially demonstrate the retraction of frame 100. After locking bars 49 and 50 are moved inward, each of legs 9, 10, 11, and 12, rotate about their respective upper and lower pivots. As demonstrated in FIGS. 11 through 15, frame 100 reach racks to a substantially planer orientation respective to the bottom of basket 70. Frame 100 is then configured to slide into a position under basket 70. The sliding is effectuated by male inner tracks 46, 45, 40, and 42, moving along the interior of each of their corresponding female tracks 47, 48, 41, and 43, the relationship of which are shown in FIG. 3.

Female tracks 47, 48, 41, and 43 are stationary and corresponding male inner tracks 46, 45, 40, and 42 move along the interior of each of the female tracks.

Figure 5:
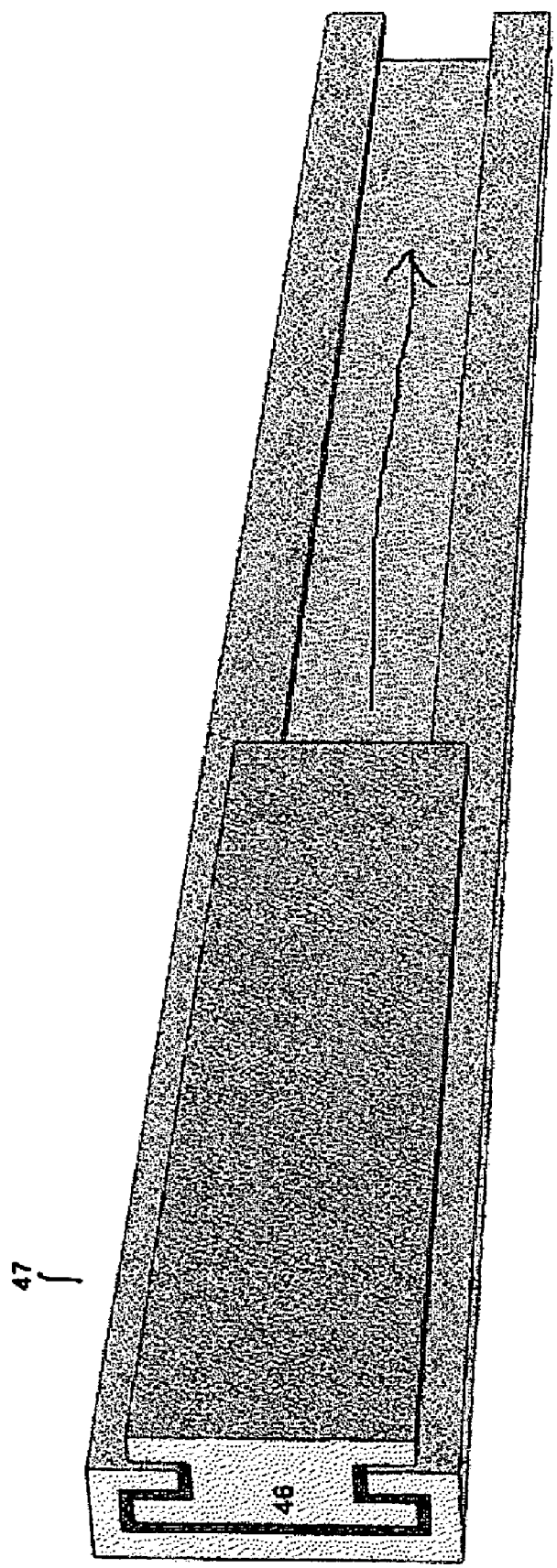
FIG. 5 is an expanded view showing these slidable relationships between a stationary female track and a corresponding slidable male track.
Figure 6:
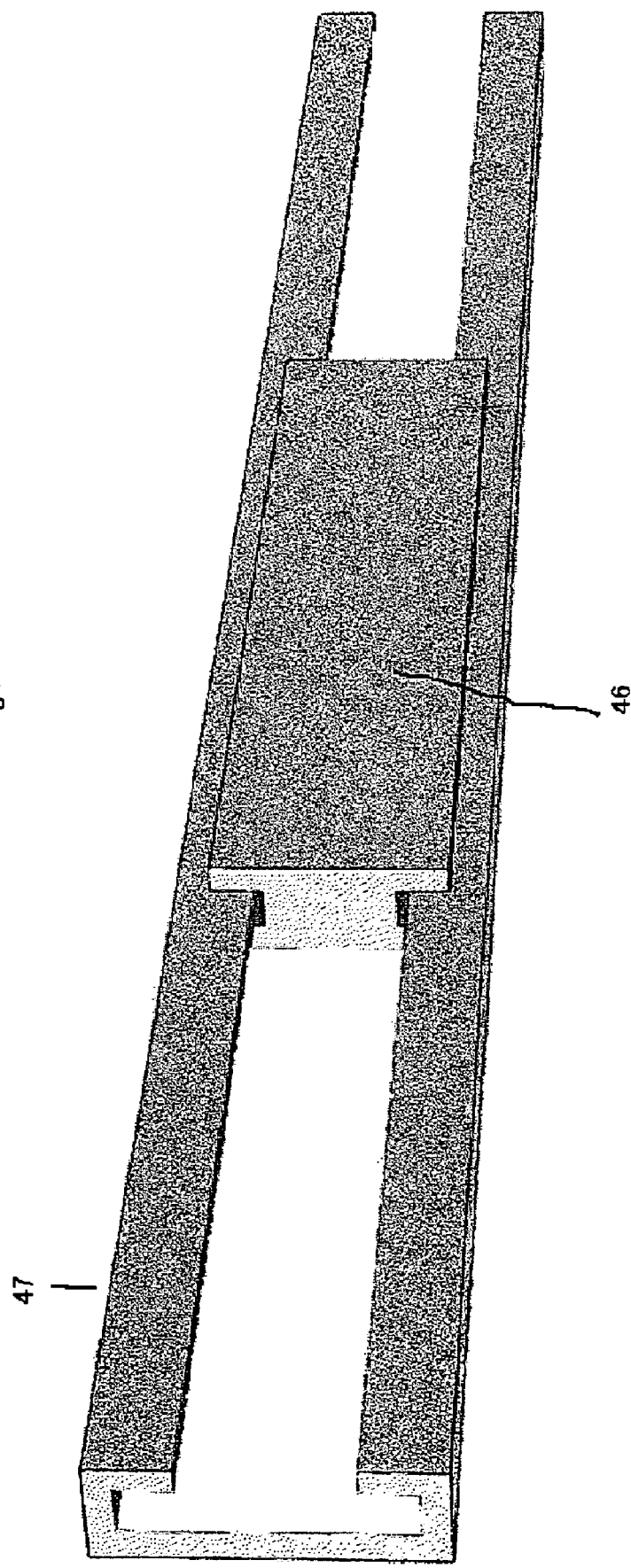
FIG. 6 demonstrates the relationship from FIG. 5 whereby the male track is moved along the interior of the female track.
Figure 7:
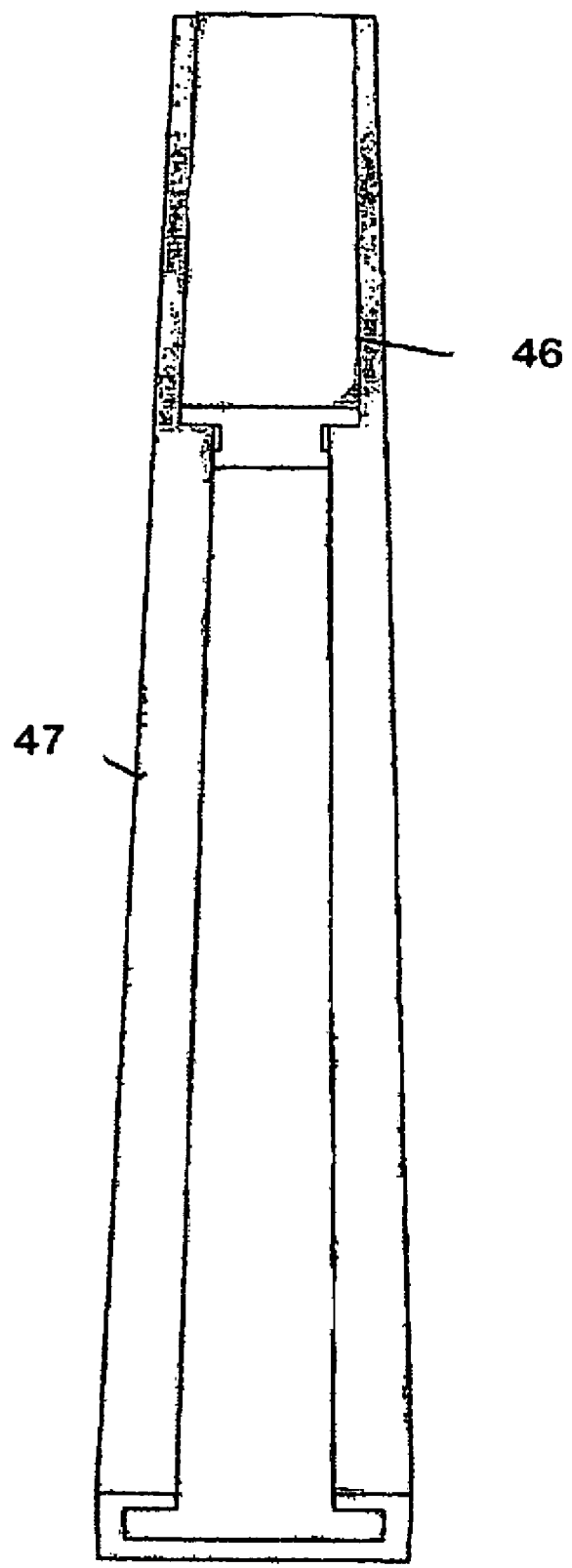
FIG. 7 demonstrates relationship in FIG. 5 whereby the male track is moved along the interior distance of the female track.
Figure 8:
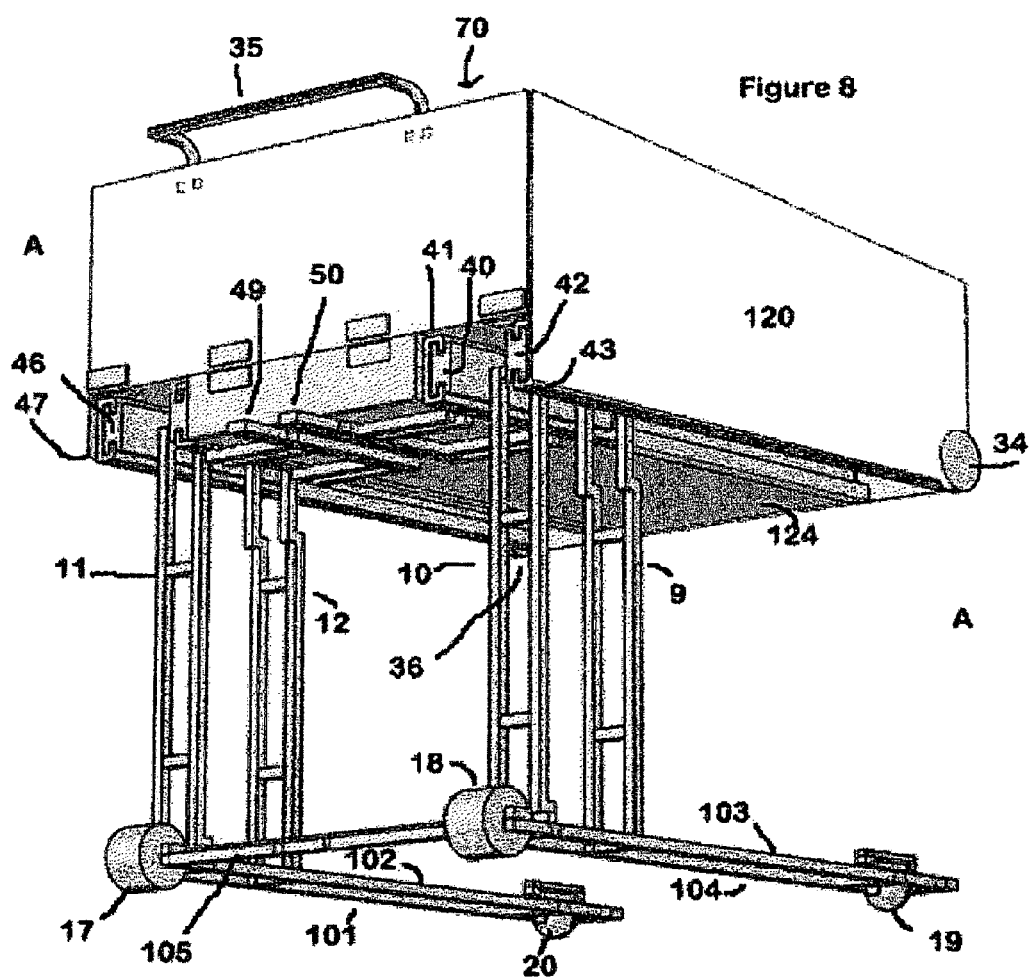
Figure 9:
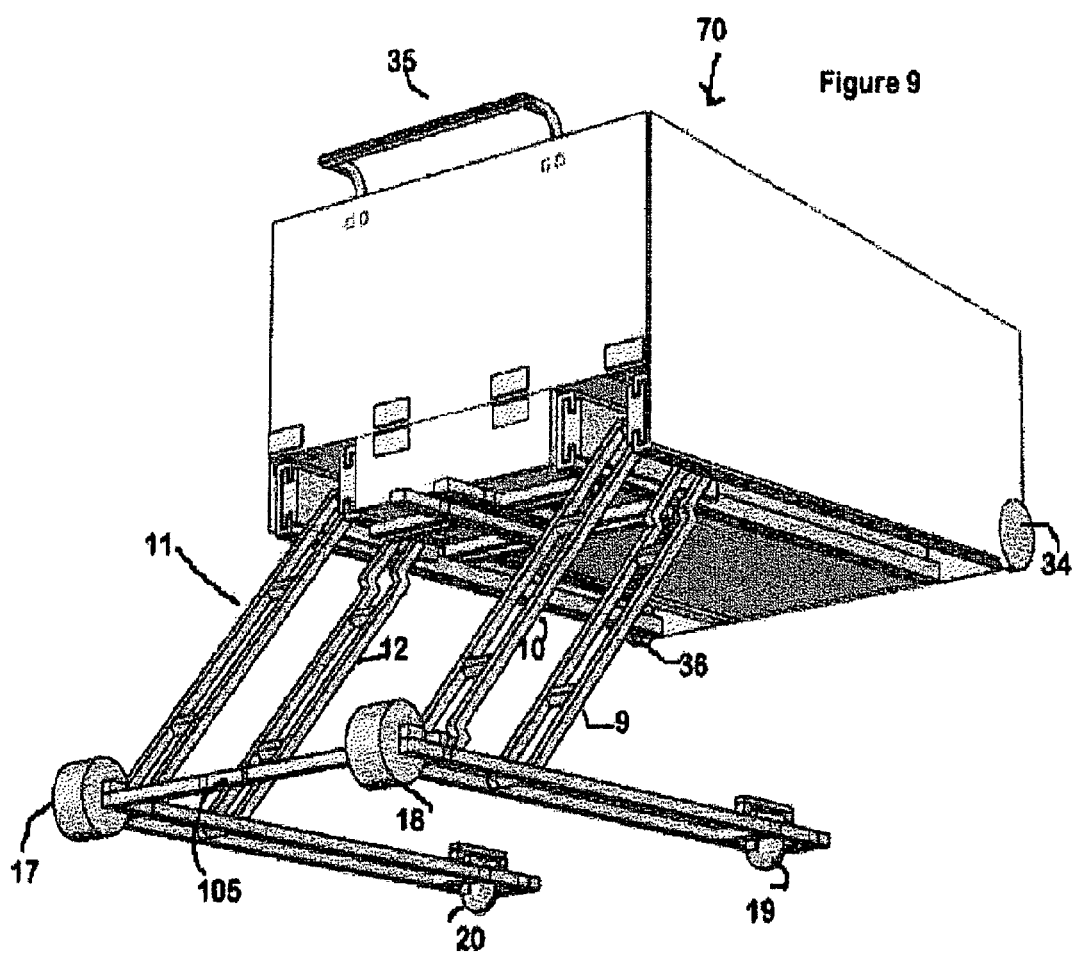
Figure 10:
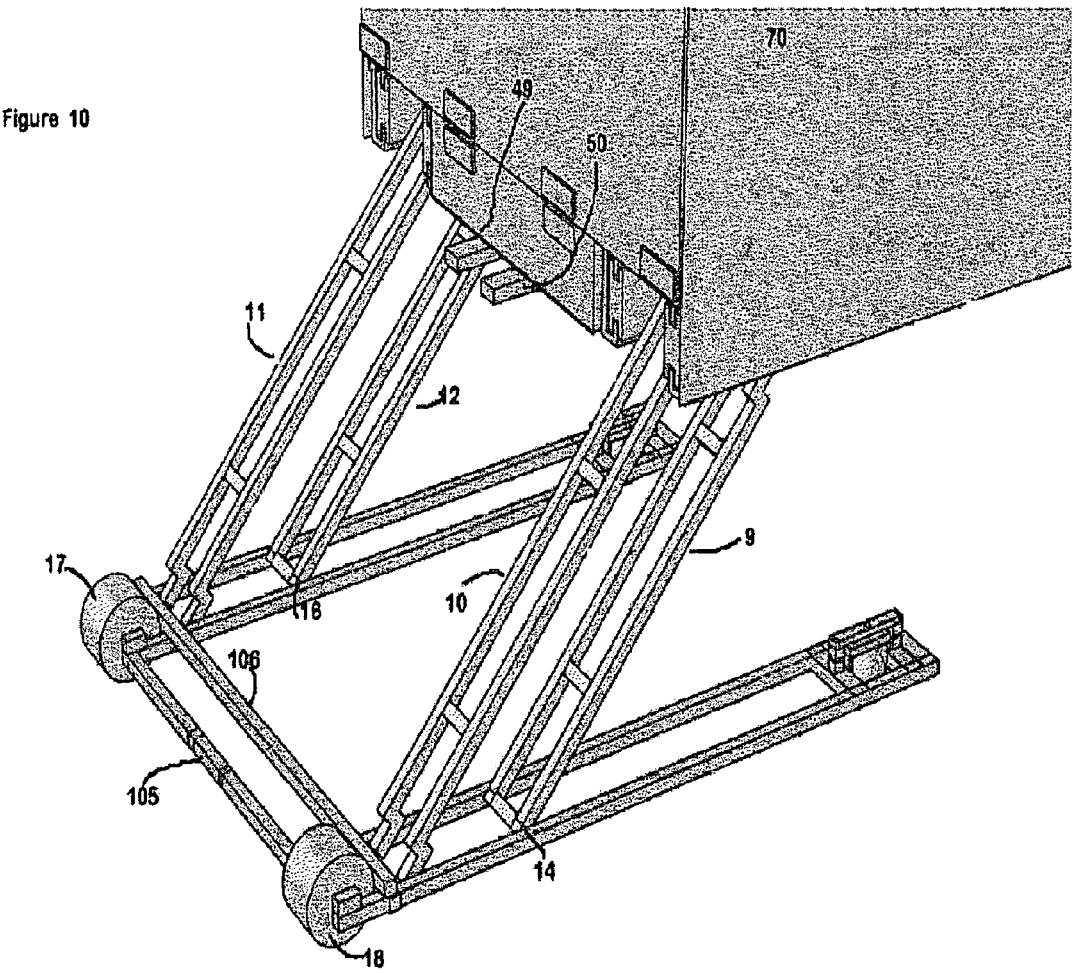
Figure 11:
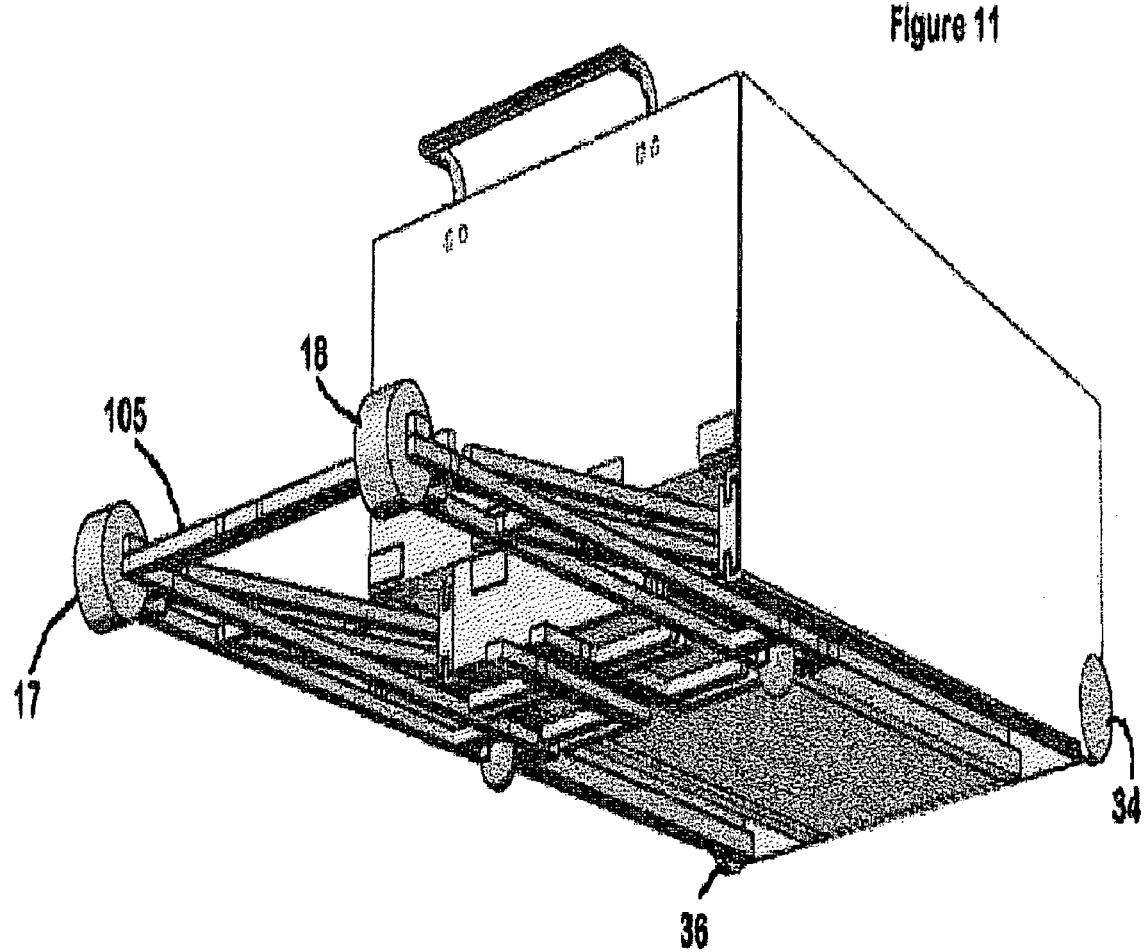
Figure 12:
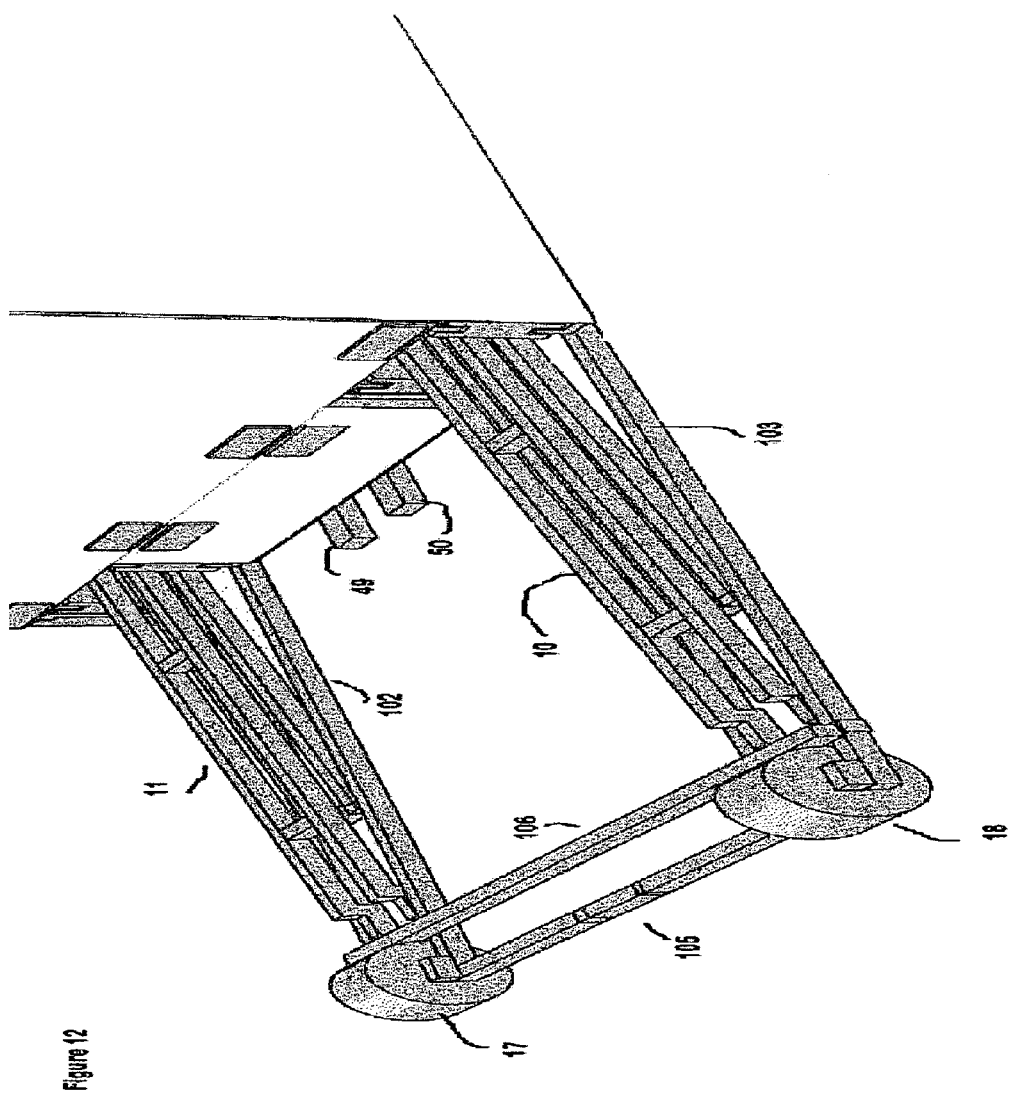
Figure 13:
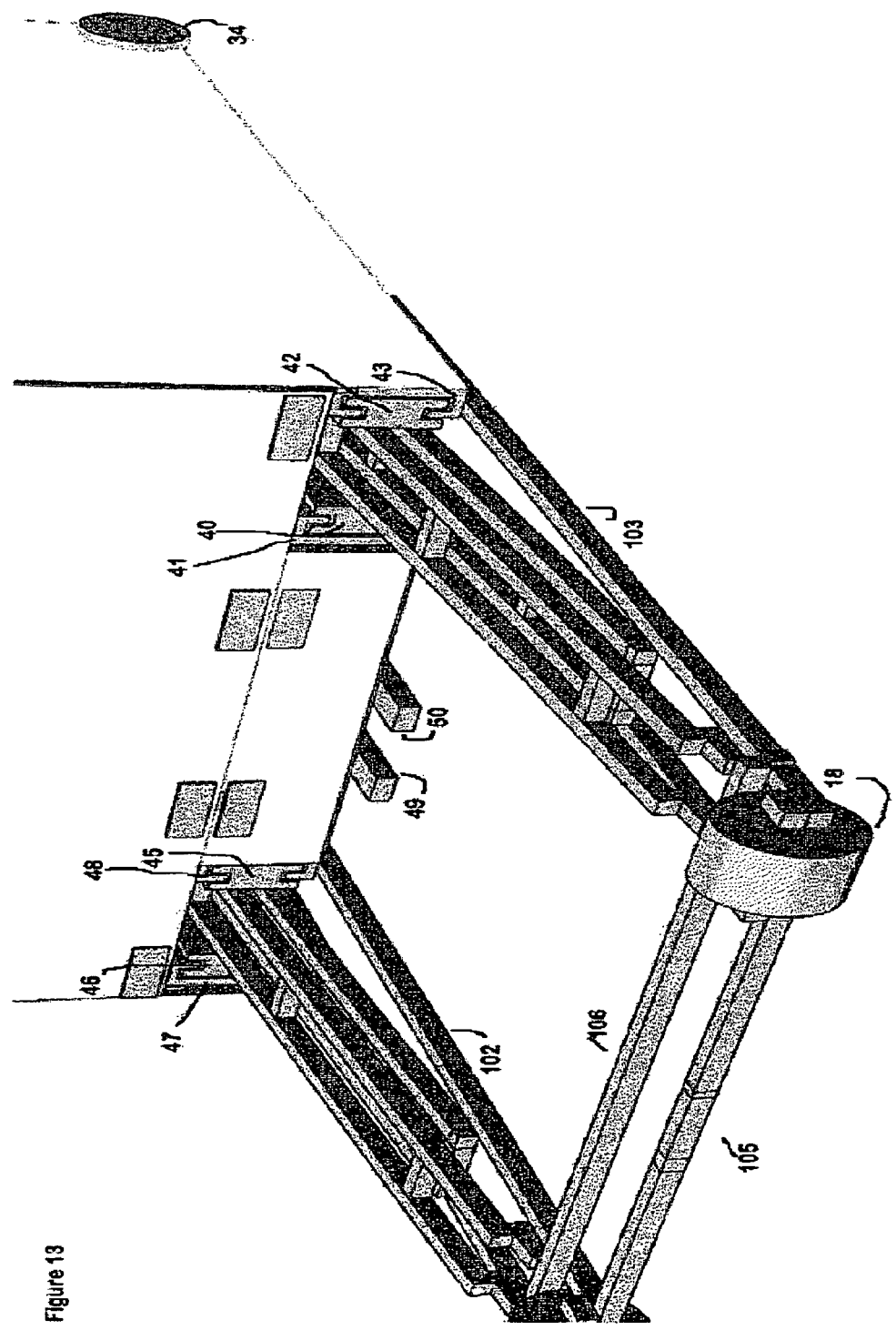
Figure 14:
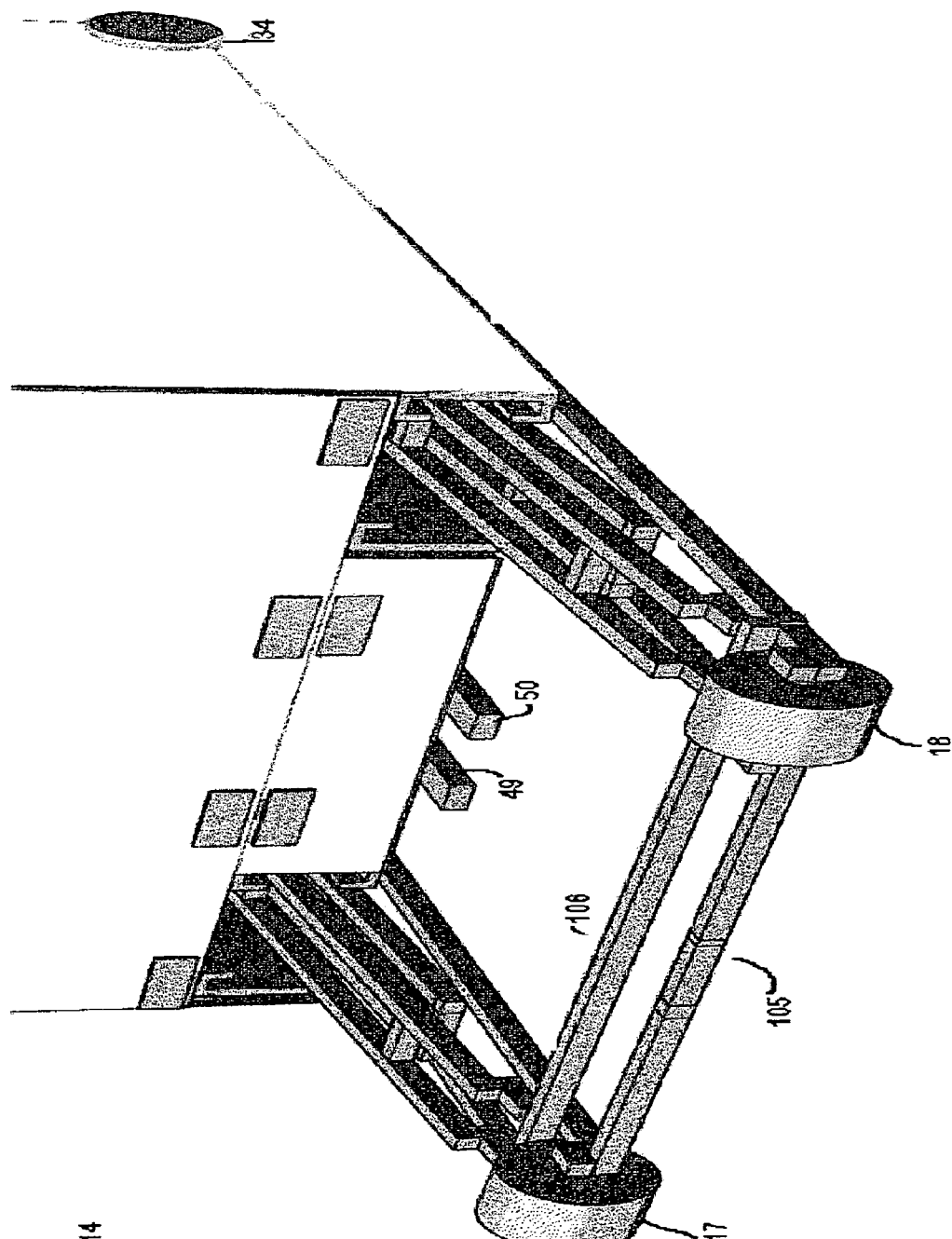
Figure 15:
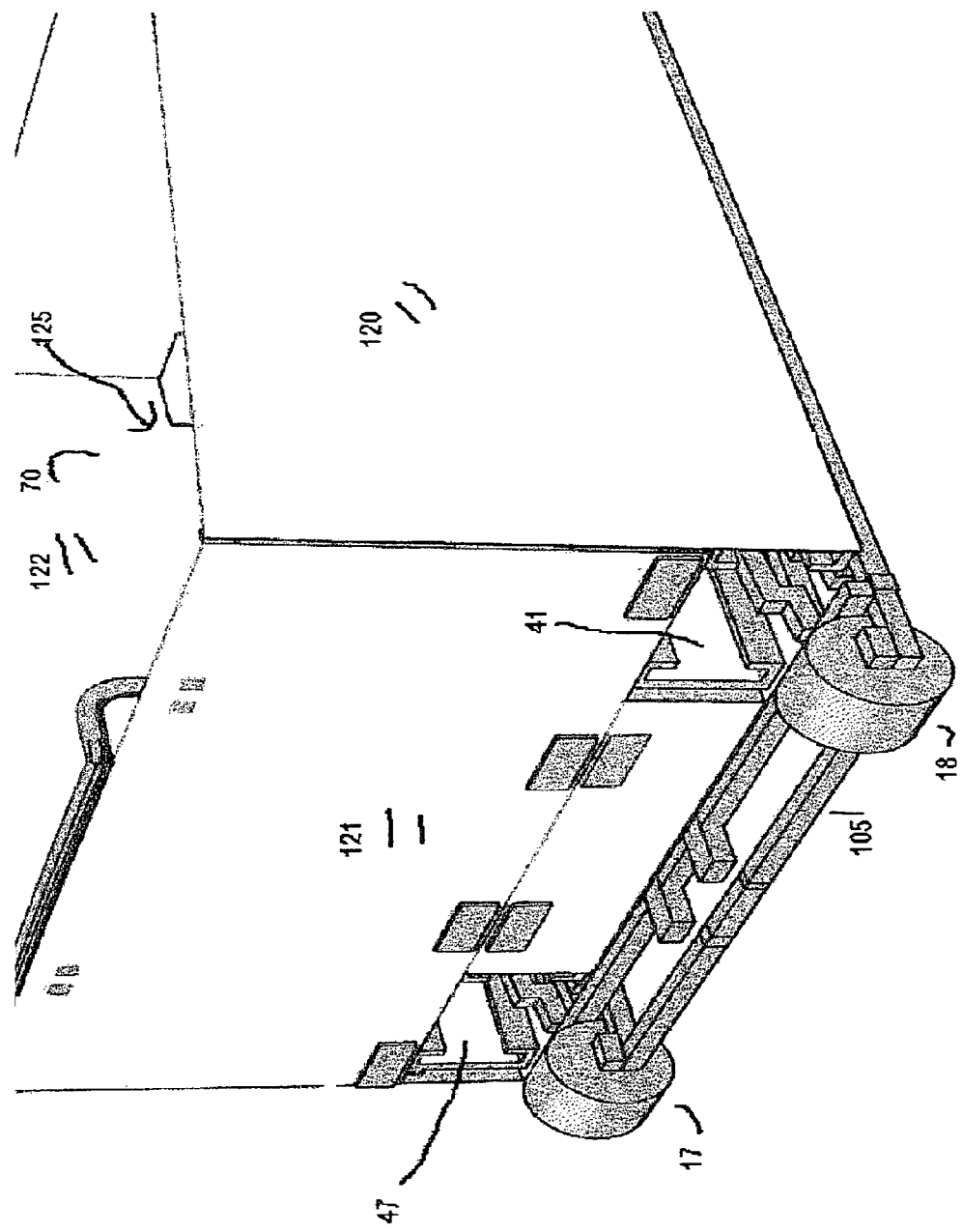

FIGS. 5-7 demonstrate the interrelationship of corresponding male and female tracks and the movement of male track 46 along the interior of female track 47.

In use, shopping cart 200 will be positioned outside a vehicle trunk or loading area of a vehicle.

Locking bars 49 and 50 will be moved inward a long plane A-A, and frame 100 will retract as described. Handle 35 will be used to move shopping cart 200 into a vehicle. Basket 70 has wheels 34 and 36 on the front underside portion of basket 70. When shopping cart 200 has frame 100 retracted, handle 35 may be used to raise the back region of basket 70 and to engage wheels 34 and 36 with an interior vehicle surface to easily roll shopping cart 200 into a desired position in a vehicle.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A shopping cart comprising;
  (a) a basket having an inside level and an outside level, said outside level being higher than said inside level, said basket further including first and second laterally spaced female track sections located on a bottom face of said basket;
  (b) a handle;
  (c) first and second pairs of vertical members extending downward from said basket, said first and second pairs of vertical members being laterally spaced from one another;
  (d) at least one wheel attached to at least one vertical member of each of said first and second pair of vertical members;
  both vertical members of said first vertical member pair each pivotably connected at respective lower ends to a first lateral side of a longitudinally extending frame;
  both vertical members of said second vertical member pair each pivotally connected at respective lower ends to a second lateral side of said longitudinally extended lower frame;
  both vertical members of said first vertical member pair each pivotally connected at respective upper ends to a first male track section;
  both vertical members of said second vertical member pair each pivotally connected at respective upper ends to a second male track section spaced laterally from said first male track section;
  said first and second male track sections adjacently slidably connected to said first and second laterally spaced female track sections, respectively, further forming a slidably retractable frame section;
  a lock and release mechanism attached to said bottom face of said basket, said mechanism selectively engaging said vertical members to lock said vertical members into a downwardly extending position, said mechanism selectively releasing said vertical members to allow said vertical members to be retracted;
  said vertical members, said male track sections and said longitudinally extending lower frame forming a rotationally retractable structure wherein said vertical members all simultaneously retract in a rotational direction towards said handle;

said male track sections and said female track sections forming a slidably retractable structure wherein said vertical members, said male track sections and said longitudinally extending lower frame all simultaneously slide into a position under said basket.

* * * * *